United States Patent
Li et al.

(10) Patent No.: US 11,949,087 B2
(45) Date of Patent: Apr. 2, 2024

(54) METHOD FOR PREPARING GRAPHENE-COATED POWDER MATERIAL, AND PRODUCT OF METHOD

(71) Applicants: BEIJING TUNGHSU CARBON ADVANCED MATERIALS TECHNOLOGY CO., LTD., Beijing (CN); TUNGHSU GROUP CO., LTD., Hebei (CN)

(72) Inventors: Qing Li, Beijing (CN); Yunxiao Tong, Beijing (CN); Heran Li, Beijing (CN); Zhonghui Wang, Beijing (CN)

(73) Assignees: BEIJING TUNGHSU CARBON ADVANCED MATERIALS TECHNOLOGY CO., LTD., Beijing (CN); TUNGHSU GROUP CO., LTD., Hebei (CN)

( * ) Notice: Subject to any disclaimer, the term of this patent is extended or adjusted under 35 U.S.C. 154(b) by 622 days.

(21) Appl. No.: 16/617,775

(22) PCT Filed: May 31, 2017

(86) PCT No.: PCT/CN2017/086632
§ 371 (c)(1),
(2) Date: Nov. 27, 2019

(87) PCT Pub. No.: WO2018/049844
PCT Pub. Date: Mar. 22, 2018

(65) Prior Publication Data
US 2020/0091496 A1 Mar. 19, 2020

(51) Int. Cl.
*H01M 4/04* (2006.01)
*H01M 4/36* (2006.01)
*H01M 4/38* (2006.01)
*H01M 4/62* (2006.01)

(52) U.S. Cl.
CPC ....... *H01M 4/0416* (2013.01); *H01M 4/0497* (2013.01); *H01M 4/366* (2013.01); *H01M 4/38* (2013.01); *H01M 4/625* (2013.01)

(58) Field of Classification Search
None
See application file for complete search history.

(56) References Cited

U.S. PATENT DOCUMENTS

| | | | |
|---|---|---|---|
| 5,558,954 A * | 9/1996 | Morrison | H01M 4/587 423/447.4 |
| 8,611,070 B2 | 12/2013 | Ivanovici et al. | |
| 2017/0288229 A1* | 10/2017 | Wang | C08J 3/212 |
| 2018/0006299 A1* | 1/2018 | Daigle | H01M 10/0525 |

FOREIGN PATENT DOCUMENTS

| | | | |
|---|---|---|---|
| CN | 103078114 A | 5/2013 | |
| CN | 103151521 A | 6/2013 | |
| CN | 103187558 A | 7/2013 | |
| CN | 103427072 A | 12/2013 | |
| CN | 103500826 A | 1/2014 | |
| CN | 103682359 A | 3/2014 | |
| CN | 104538606 A | 4/2015 | |
| CN | 104577113 A | 4/2015 | |
| CN | 105845890 A | 8/2016 | |
| CN | 105895907 A | 8/2016 | |
| WO | WO-2016095743 A1 * | 6/2016 | C08F 120/44 |
| WO | WO-2017/002108 A1 | 1/2017 | |

OTHER PUBLICATIONS

Ding et al. "Preparation of nano-structured LiFePO4/graphene composites by co-precipitation method". Electrochemistry Communications 12 (2010) (Year: 2010).*
Su et al. "A novel LiFePO4/ graphene/carbon composite as a performance-improved cathode material for lithium-ion batteries." Electrochimica Acta 64 (2012) (Year: 2012).*
Sun et al. "Preparation and characterization of lithium-rich ternary cathode materials using novel chelating agent and solvent". Journal of Alloys and Compounds 723 (2017) 1142-1149 (Year: 2017).*
Su et al., A novel LiFePO4/graphene/carbon composite as a performance-improved cathode material for lithium-ion batteries. Electrochimica Acta. Mar. 1, 2012;64:190-5.
Ding et al., Preparation of nano-structured LiFePO4/graphene composites by co-precipitation method. Electrochemistry Communication. 2010;12:10-13.
International Search Report and Written Opinion for Application No. PCT/CN2017/086632, dated Jan. 16, 2018, 11 pages.

* cited by examiner

*Primary Examiner* — Jose I Hernandez-Kenney
(74) *Attorney, Agent, or Firm* — Maine Cernota & Curran (57) ABSTRACT

A method for preparing a graphene-coated powder material, comprising: A) dispersing a graphene powder and/or graphene oxide powder, a powder material to be coated with graphene, and a polymeric co-coating agent in a first organic solvent to form a first organic solvent dispersion; B) mixing the first organic solvent dispersion with a second organic solvent and separating a precipitate after sedimentation; and C) annealing the precipitate in an inert atmosphere to obtain the graphene-coated powder material; wherein the polymeric co-coating agent is soluble in the first organic solvent but insoluble in the second organic solvent. The present invention also relates to a graphene-coated powder material prepared by the method.

15 Claims, 2 Drawing Sheets

METHOD FOR PREPARING GRAPHENE-COATED POWDER MATERIAL, AND PRODUCT OF METHOD

CROSS-REFERENCE TO RELATED APPLICATIONS

This application is a U.S. national stage filing, under 35 U.S.C. § 371(c), of International Application No. PCT/CN2017/086632, filed on May 31, 2017. The entire contents of the aforementioned application are incorporated herein by reference.

TECHNICAL FIELD

The present invention relates to the technical field of graphene coating. In particular, the present invention relates to a method of preparing a graphene-coated powder material, and a product produced thereby.

BACKGROUND OF THE INVENTION

Graphene is an allotrope of carbon, which is theoretically embodied as carbon atoms in a single plane. In literatures, graphene is generally expressed as a two-dimensional cellular lattice having $sp^2$-bonded carbon atoms. In practice, those skilled in the art often refer to graphene as a carbon material that is expressed not only as a single plane but also as multilayers of single carbon plane. Due to its unique structure, graphene has an extremely high specific surface area and excellent electronic conductivity, and therefore can be used as an excellent carrier. The properties of graphene make it have a very broad application prospect in certain applications such as semiconductors and photovoltaic products.

Lithium ion battery is a rechargeable battery that operates depending on the movement of lithium ions between cathodes and anodes. It offers advantages such as high working voltage, high energy density, long cycle life, and stable voltage platform. At present, it has been widely used in 3 C electronics, and is also a main choice of power batteries for electric vehicles and electric tools. Electrode materials, especially cathode materials, account for a considerable proportion in the constitution of lithium-ion batteries, and are also a key factor affecting their performance. At present, commercialized lithium ion battery cathode materials mainly include lithium cobaltate, lithium iron phosphate and ternary materials. However, the electronic conductivity of these materials is low, resulting in poor rate and cycle performances. Therefore, it is necessary to further improve their original performances through modification by doping with a material having a better conductivity.

In recent years, graphene has been introduced into electrode materials of lithium ion batteries, in an attempt to fully exert synergistic effects between different components, so as to solve the problems of the cathode materials such as poor electronic conductivity and increased resistivity between the electrode and the electrolyte under charging and discharging at a large rate.

At present, most graphenes are directly added to the lithium battery cathode material as a conductive additive, and after they are mixed in liquid phase, the solvent is distilled off to obtain a graphene-modified lithium ion battery cathode material. Although a certain effect has been achieved by this method, such physical mixing can hardly achieve good coating of the lithium ion cathode material with graphene. In order to solve this problem, chemical coating methods were proposed. The chemical coating method involves mixing graphene oxide as a raw material with a lithium ion battery cathode material, and adding a reducing agent to achieve the reduction of the graphene oxide, while achieving the coating effect by using the π-π stacking between graphenes. However, most lithium ion battery cathode materials have very strict requirements on moisture. The chemical coating process will be carried out in an organic solvent having a high boiling point (above 200° C.). Therefore, subsequent solvent removal will become a huge challenge. Moreover, the coated material, after several times of charging and discharging, is prone to technical problems, e.g., the coating will be loose and easy to fall off, so a good coating effect cannot be achieved.

Therefore, there is a need for a novel method for preparing a graphene-coated powder material, such as a lithium ion battery cathode material, and a product prepared by the method. In particular, there is a need for a method and product that are more effectively improved in the coating of a powder material with graphene. In the case that the powder material is a lithium ion battery cathode material, good graphene coating is expected to improve the rate performance and/or the cycle performance of the lithium ion battery cathode material. More advantageously, there is a need for a method and product that is simple in process, environmentally friendly, and/or suitable for industrial production.

SUMMARY OF THE INVENTION

The inventors of the present application have developed a method for coating a powder material with graphene, which is particularly suitable for achieving the coating of a lithium ion cathode material with graphene.

In a first aspect, the present invention relates to a method for preparing a graphene-coated powder material, comprising the steps of:
  A) providing a first organic solvent dispersion of a graphene powder and/or graphene oxide powder, a powder material to be coated with graphene, and a polymeric co-coating agent dispersed in a first organic solvent;
  B) mixing the first organic solvent dispersion with a second organic solvent and separating a precipitate; and
  C) annealing the precipitate in an inert atmosphere to obtain the graphene-coated powder material;
wherein the polymeric co-coating agent is soluble in the first organic solvent but insoluble in the second organic solvent.

In a second aspect, the present invention relates to a graphene-coated powder material prepared by the method according to the present invention.

In the present invention, the graphene powder and/or graphene oxide powder are coated on the surface of the powder material by the aid of the polymeric co-coating agent through solvent replacement, utilizing the difference in solubility of the polymeric co-coating coating agent in different organic solvents and the macromolecular network structure of the polymer. Then, by annealing in an inert atmosphere, the polymeric co-coating is further robustly carbonized (graphene oxide is also reduced to graphene at a high temperature in the case of using the graphene oxide powder), thereby achieving the stable coating of the powder material with graphene. As compared with the simple physical blending methods and the chemical coating methods in the prior art, the present invention provides at least one of the following advantages: 1) the problems existing in the traditional physical blending methods, such as uneven dispersion and poor coating effect, are improved; 2) the problem that the graphene coating is loose and easy to fall off existing in the traditional chemical coating methods is improved; 3) when a lithium ion cathode material is coated with graphene by this method, the electronic conductivity of the lithium ion cathode material is significantly improved, such that its cycle performance and rate performance are significantly improved; and 4) the process of preparation is simple and easy to carry out, avoids energy consumption and release of toxic gas caused by a high-temperature solvent removal process, and is suitable for industrial production. The method of the present invention is particularly suitable for graphene coating processes which can be carried out in an organic solvent.

BRIEF DESCRIPTION OF THE DRAWINGS

The present invention will be illustrated in detail with reference to the following detailed description and the accompanying drawings, so as to enable those skilled in the art to better understand the present invention. However, they should not be construed as limiting the scope of the present invention in any way.

DETAILED DESCRIPTION OF THE INVENTION

The present invention provides the following embodiments:
1. A method for preparing a graphene-coated powder material, comprising the steps of:
   A) providing a first organic solvent dispersion of a graphene powder and/or graphene oxide powder, a powder material to be coated with graphene, and a polymeric co-coating agent dispersed in a first organic solvent;
   B) mixing the first organic solvent dispersion with a second organic solvent and separating a precipitate; and
   C) annealing the precipitate in an inert atmosphere to obtain the graphene-coated powder material;
   wherein the polymeric co-coating agent is soluble in the first organic solvent but insoluble in the second organic solvent.
2. The method according to Item 1, wherein the powder material is a lithium ion battery cathode material.
3. The method according to Item 2, wherein the lithium ion battery cathode material is one or more selected from the group consisting of lithium manganate, lithium cobaltate, lithium iron phosphate, and a ternary material.
4. The method according to Item 3, wherein the ternary material is one or more selected from the group consisting of nickel-cobalt-manganese ternary materials, nickel-cobalt-aluminum ternary materials, and lithium-rich ternary materials.
5. The method according to any one of Items 1-4, wherein the polymeric co-coating agent is one or more selected from the group consisting of polyolefins, polyesters, polyethers, polyamides, polyurethanes, celluloses, polysiloxanes, polynitriles, polyureas, and polysulfones.
6. The method according to any one of Items 1-4, wherein the polymeric co-coating agent is one or more selected from the group consisting of polyethylene, polyvinylidene fluoride, polyvinyl chloride, polystyrene, polyvinyl acetate, polyvinyl ether, polypropylene, polyacrylonitrile, polymethyl methacrylate and polycarbonate.
7. The method according to any one of Items 1-6, wherein the first organic solvent is one or more selected from the group consisting of dimethylformamide, dimethylacetamide, dimethyl sulfoxide, N-methylpyrrolidone, benzene, toluene, chloroform, tetrahydrofuran, and acetone.
8. The method according to any one of Items 1-7, wherein the second organic solvent is one or more selected from the group consisting of methanol, ethanol and diethyl ether.
9. The method according to any one of Items 1-8, wherein the step A) comprises the steps of:
   A1) ultrasonically dispersing the graphene powder and/or graphene oxide powder in the first organic solvent, to form a graphene and/or graphene oxide dispersion;
   A2) uniformly dispersing the powder material to be coated with graphene in the first organic solvent, adding the polymeric co-coating agent, and stirring the mixture to give a powder material dispersion; and
   A3) mixing the graphene and/or graphene oxide dispersion with the powder material dispersion to obtain the first organic solvent dispersion.
10. The method according to any one of Items 1-9, wherein the step B) comprises the steps of:
    B1) injecting the first organic solvent dispersion into the second organic solvent while stirring;
    B2) subjecting the mixture from step B1) to sedimentation to give a precipitate; and
    B3) separating and drying the precipitate.
11. The method according to any one of Items 1-10, wherein the annealing comprises the steps of:
    1) raising the temperature from room temperature to an intermediate temperature of A ° C. at a ramping rate of 1-3° C./min, and then holding for X hours; and
    2) further raising the temperature to a maximum temperature of B ° C. at a ramping rate of 3-6° C./min, and then holding for Y hours;
    wherein Y≥2X≥2, and 300≤A<B≤800.
12. The method according to any one of Items 1-11, wherein the graphene powder and/or graphene oxide powder is used in an amount of from 1 wt % to 25 wt % based on the total weight of the graphene powder and/or graphene oxide powder, the powder material to be coated with graphene, and the polymeric co-coating agent.

13. The method according to any one of Items 1-12, wherein the polymeric co-coating agent is used in an amount of from 0.01 wt % to 20 wt % based on the total weight of the graphene powder and/or graphene oxide powder, the powder material to be coated with graphene, and the polymeric co-coating agent.

14. The method according to any one of Items 1-13, wherein the second organic solvent has a boiling point lower than that of the first organic solvent.

15. The method according to any one of Items 1-14, wherein the volume ratio of the second organic solvent to the first organic solvent used is 2:1 or more.

16. The method according to any one of Items 1-15, wherein the graphene powder is prepared by a redox process and/or a liquid phase ultrasonic exfoliation process.

17. A graphene-coated powder material prepared by the method according to any one of Items 1-16.

The numerical ranges herein include all values from a lower value to a higher value in a certain increment and including the lower value and the higher value. For example, if the numerical range is from 100 to 500, then all individual values, such as 100, 101, 102, . . . 498, and 499, should be considered to have been listed, and all sub-ranges, such as 100 to 144, 155 to 170, 197 to 200, 268-390, 420-500, and the like, should also be considered to have been listed.

Powder Material

As used herein, the term "powder" refers to an aggregate composed of a plurality of particles and voids among the particles. Specifically, the constitution of a powder should satisfy the following three criterions: 1) the microscopic basic unit is a small solid particle; 2) macroscopically, it is an aggregate of a plurality of particles; and 3) there is interaction among the particles. In other words, an aggregate of solid particles is defined as powder, and may also be referred to as "granules", "powder granules", "particles", or the like.

Particles are the smallest unit that makes up the powder. The particles of the powder material suitable for use in the present invention may be particles having a particle size ranging from $10^{-9}$ m to $10^{-3}$ m. In one embodiment, the powder material of the present invention consists of particles having a particle size ranging from 0.1 to 500 micrometers, preferably from 0.5 to 200 micrometers, more preferably from 1 to 100 micrometers, even more preferably from 1 to 20 micrometers.

Examples of the powder material suitable for use in the present invention include, but are not limited to, metal powders, oxide powders, nitride powders, carbide powders, hydroxide powders, metal salt powders, lithium ion battery cathode materials, lithium ion battery anode material, and any combination thereof.

In one embodiment, the powder material is a lithium ion battery cathode material. In the lithium ion battery cathode materials currently developed and used, transition metal oxides, including, but not limited to, lithium manganese oxides such as lithium cobaltate, lithium nickel cobaltate, lithium nickel manganate and lithium nickel manganese cobaltate ternary materials having a layered salt structure, spinel-type lithium manganate, and olivine-type lithium iron phosphate, exhibit the best performance.

In a specific embodiment, the lithium ion battery cathode material is one or more selected from the group consisting of lithium manganate ($LiMnO_2$), lithium cobaltate ($LiCoO_2$), lithium iron phosphate ($LiFePO_4$), and a ternary material.

In a preferred embodiment, the lithium ion battery cathode material is a ternary material. The ternary material for use in lithium ion batteries was first reported in 1999 as a nickel-cobalt-manganese ternary transition metal oxide composite having a structural formula of $LiNi_{1-x-y}Co_xMn_yO_2$ (0<x<0.5, and 0<y<0.5). The material offers combined advantages such as the good cycle performance of $LiCoO_2$, the high specific capacity of $LiNiO_2$, and the high safety and low cost of $LiMnO_2$.

According to one embodiment of the present invention, the ternary material is one or more selected from the group consisting of nickel-cobalt-manganese ternary materials, nickel-cobalt-aluminum ternary materials, and lithium-rich ternary materials. Preferably, the nickel-cobalt-manganese ternary material has a structural formula of $LiNi_{1-x-y}Co_xMn_yO_2$ (0<x<0.5, and 0<y<0.5). In one embodiment, the nickel-cobalt-manganese ternary material is one or more selected from the group consisting of $LiNi_{1/3}Co_{1/3}Mn_{1/3}O_2$ (type 333), $LiNi_{0.5}Co_{0.3}Mn_{0.2}O_2$ (type 532), $LiNi_{0.4}Co_{0.4}Mn_{0.2}O_2$ (Type 442), $LiNi0.6Co0.2Mn0.2O2$ (type 622), and $LiNi_{0.8}CO_{0.10}Mn_{0.1}O_2$ (type 811) ternary materials. According to another embodiment of the present invention, the nickel-cobalt-aluminum ternary material is one or more selected from the group consisting of $LiNi_{0.5}Co_{0.3}Al_{0.2}O_2$ (type 532), $LiNi_{0.6}Co_{0.2}Al_{0.2}O_2$ (type 622), and $LiNi_{0.8}CO_{0.10}Al_{0.10}O_2$ (type 811).

According to one embodiment of the present invention, the ternary material is present in the form of a crystalline powder. In one embodiment, the ternary material crystal belongs to the hexagonal crystal system with an α-$NaFeO_2$-type layered structure and a space group of R3m, wherein $Li^+$ and the transition metal ions alternately occupy positions 3a (0,0,0) and 3b (0,0,½), and $O^{2-}$ is located at position 6c (0,0,z). The 0 at position 6c is cubic close-packed, and the transition metal layer is composed of Ni, Mn, and Co. Each transition metal atom is surrounded by 6 oxygen atoms to form an $MO_6$ octahedral structure. The transition metal ion at position 3b and Li at position 3a alternately occupy the voids of the octahedron, and $Li^+$ is intercalated between the $LiNi_{1-x-y}Co_xMn_yO_2$ layers formed of the transition metal atoms and oxygen.

The ternary materials have different electrochemical properties when the ratios of transition metals are different. Generally, an increase in Co content is beneficial to the stabilization of the layered structure of the compound, thereby improving the cycle performance; an increase in Ni content can achieve a higher capacity, but will result in the deterioration of the cycle performance; and the incorporation of Mn can reduce the cost and improve the stability of the matrix, but too much Mn will lead to formation of a spinel phase, thereby destroying the layered structure.

Graphene/Graphene Oxide Powder

Graphene, as a two-dimensional free-state atomic crystal, is the basic structural unit for constructing zero-dimensional fullerene, one-dimensional carbon nanotubes and three-dimensional graphite. It has special physical and chemical properties such as high electrical conductivity, high thermal conductivity, high hardness and high strength, and thus can find broad application in the fields of electronics, information, energy, material and biomedicine. Common processes for producing graphene powders include a liquid phase ultrasonic exfoliation process (also referred to as mechanical exfoliation process, or mechanical ultrasonic process), a redox process, a SiC epitaxial growth process, etc. However, the application of graphene is limited since it is hydrophobic and prone to agglomeration due to the strong van der Waals force. The emergence of graphene oxide just solves the above problems.

Graphene oxide, as the oxide of graphene, has substantially the same structure as graphene, except that a large number of oxygen-containing groups are attached to the base plane that infinitely extends in the two-dimensional space composed of one layer of carbon atoms, —OH and C—O—C are present in the plane, and C═O and COOH are contained at the edges of the sheet layer. As compared with graphene, graphene oxide has more excellent properties including not only the good wettability and the surface activity, but also the ability of being peeled off upon intercalation of small molecules or polymers. It plays a very important role in improving the comprehensive performances of materials such as the thermal, electrical and mechanical properties.

Graphene oxide can be reduced to graphene by various methods as needed, such as, but not limited to, a reducing agent reduction method, a high temperature heat treatment reduction method, an electrochemical reduction method, a solvothermal reduction method, a catalytic reduction method, a microwave reduction method, etc. The high-temperature heat treatment reduction method is a method previously used for reducing graphene oxide, comprising, for example, rapidly heating graphene oxide to a certain temperature, e.g., above 800° C., in an inert atmosphere, to remove oxygen-containing groups and achieve sufficient exfoliation of graphene oxide, and in practice, to achieve sufficient exfoliation between the graphene oxide sheet layers. Most of the oxygen-containing groups on the surface of graphene oxide are very sensitive to temperature, and will fall off the surface of graphene oxide when the temperature rises to about 230° C., thereby achieving the reduction of graphene oxide.

In the present invention, graphene and graphene oxide are used in the form of powder. The particle size of graphene and graphene oxide is preferably in the range of 0.01-50 micrometers, preferably 0.05-20 micrometers, more preferably 0.1-10 micrometers, even more preferably 0.1-5 micrometers.

In one embodiment, the graphene powder is prepared by a redox process and/or a liquid phase ultrasonic exfoliation process.

Graphene-Coated Powder Material

The present inventors have found that the graphene powder and/or graphene oxide powder can be coated on the surface of a powder material dispersed in an organic solvent by utilizing the difference in solubility of the polymer in different organic solvents and the phenomenon that deposition will occur when the polymer changes from a dissolved state to an undissolved state, and the macromolecular network structure of the polymer helps make this coating more stable and tight.

Specifically, the method for preparing a graphene-coated powder material according to the present invention comprises providing a first organic solvent dispersion of a graphene powder and/or graphene oxide powder, a powder material to be coated with graphene, and a polymeric co-coating agent dispersed in a first organic solvent; mixing the first organic solvent dispersion with a second organic solvent and separating a precipitate; and annealing the precipitate in an inert atmosphere to obtain the graphene-coated powder material; wherein the polymeric co-coating agent is soluble in the first organic solvent but insoluble in the second organic solvent.

As used herein, the term "soluble" means that when two or more substances are mixed with each other, they can form a homogeneous phase at the molecular level. When two substances dissolve each other, the substance having a larger mass is generally referred to as the solvent, and the substance having a smaller mass is referred to as the solute. The term "insoluble" means that when two or more substances are mixed with each other, they cannot or can hardly form a homogeneous phase at the molecular level, and layer separation or phase separation occurs.

Due to its structural complexity, the dissolution of a polymer in a solvent is much more complicated than that of a small molecule. The dissolution process of a polymer in a solvent usually comprises two stages: first, the solvent molecules penetrate into the interior of the polymer to expand the volume of the polymer, which is called "swelling"; then, the polymer molecules are uniformly dispersed in the solvent to form a homogeneous system at the level of completely dissolved molecules. Judging whether a polymer can be dissolved in a solvent usually follows the principle of "like dissolves like" and the principle of "similar polarity". The dissolution of a crystalline polymer is much more difficult than that of an amorphous polymer. Since an amorphous polymer has relatively loose molecular packing and relatively weak intermolecular interaction, solvent molecules can readily penetrate into the interior of the polymer to allow it to swell and dissolve. It is very difficult for solvent molecules to penetrate into the interior of a nonpolar crystalline polymer due to its regular molecular arrangement, tight packing, and strong intermolecular interaction force. A polar crystalline polymer can be dissolved in a polar solvent. A crosslinked polymer generally can only be swollen and cannot be dissolved.

In one embodiment of the present invention, the polymeric co-coating agent is one or more selected from the group consisting of an amorphous linear polymer, a nonpolar crystalline linear polymer, and a polar crystalline linear polymer.

It is generally believed that polymers which are soluble in one or more organic solvents are suitable for use in the present invention as long as the use of the polymers or their solvents does not adversely affect the graphene/graphene oxide or the powder materials. For the selection of polymers and their solvents, reference can be made to, for example, Chapter 3, Section 1 of *Polymer Physics* (Revised Edition) (edited by Manjun He, et al., published by Fudan University Press, 1st edition, October 1990).

As non-limiting examples, some of the common types of polymeric co-coating agents that can be used in the present invention, as well as the first and second organic solvents that can be selected and used, are listed in Table 1 below.

TABLE 1

| Polymeric co-coating agent | First organic solvent | Second organic solvent |
|---|---|---|
| polyethylene | p-xylene, trichlorobenzene | acetone, diethyl ether |
| poly-1-butene | decane, decalin | lower alcohols |
| random polypropylene | hydrocarbons, isoamyl acetate | ethyl acetate, propanol |
| polyisobutylene | hexane, benzene, carbon tetrachloride, tetrahydrofuran | acetone, methanol, methyl acetate |
| polystyrene | benzene, toluene, chloroform, cyclohexanone, butyl acetate, dimethyl sulfoxide, dimethylformamide, tetrahydrofuran | lower alcohols |

TABLE 1-continued

| Polymeric co-coating agent | First organic solvent | Second organic solvent |
|---|---|---|
| polyvinyl chloride | tetrahydrofuran, cyclohexanone, ketone, dimethylformamide, dimethylacetamide | methanol, acetone, heptane |
| polyvinylidene fluoride | cyclohexanone, dimethylformamide, dimethylacetamide, N-methylpyrrolidone | aliphatic hydrocarbons, methanol |
| polyethylene isobutyl ether | isopropanol, methyl ethyl ketone, chloroform, aromatic hydrocarbons | methanol, acetone |
| polyacrylate | chloroform, acetone, ethyl acetate, tetrahydrofuran, toluene | methanol, diethyl ether, petroleum ether |
| polymethacrylate | chloroform, acetone, ethyl acetate, tetrahydrofuran, toluene | methanol, diethyl ether, petroleum ether |
| polyacrylonitrile | dimethylformamide, dimethylacetamide, dimethyl sulfoxide, N-methylpyrrolidone | alcohols, diethyl ether |
| polyacrylic acid | dimethylformamide, dimethylacetamide | methanol, diethyl ether |
| polyvinyl alcohol | dimethylformamide, dimethylacetamide, dimethyl sulfoxide | methanol, acetone, diethyl ether |
| cellulose triacetate | acetone, chloroform | methanol, diethyl ether |
| trimethylcellulose | chloroform, benzene | ethanol, diethyl ether, petroleum ether |
| aliphatic polyesters | chloroform, benzene | methanol, diethyl ether, aliphatic hydrocarbons |
| polyethylene terephthalate | m-cresol, o-chlorophenol | methanol, propanol, aliphatic hydrocarbons |
| polyamide | dimethylformamide, dimethylacetamide, m-cresol | methanol, diethyl ether |
| polyurethane (uncrosslinked) | dimethylformamide, dimethylacetamide, m-cresol | methanol, diethyl ether |
| polyoxyethylene | benzene, dimethylformamide, dimethylacetamide | aliphatic hydrocarbons, diethyl ether |
| polydimethylsiloxane | chloroform, heptane, benzene, diethyl ether | methanol, ethanol |

In one embodiment of the present invention, the polymeric co-coating agent is one or more selected from the group consisting of polyolefins, polyesters, polyethers, polyamides, polyurethanes, celluloses, polysiloxanes, polynitriles, polyureas, and polysulfones.

In one embodiment of the present invention, the polymeric co-coating agent is one or more selected from the group consisting of polyethylene, polyvinylidene fluoride, polyvinyl chloride, polystyrene, polyvinyl acetate, polyvinyl ether, polypropylene, polyacrylonitrile, polymethyl methacrylate and polycarbonate.

In one embodiment of the present invention, the first organic solvent is one or more selected from the group consisting of dimethylformamide, dimethylacetamide, dimethyl sulfoxide, N-methylpyrrolidone, benzene, toluene, chloroform, tetrahydrofuran, and acetone. In a specific embodiment, the first organic solvent can be a mixture of two or more solvents, for example, a mixture of two or more solvents selected from the group consisting of dimethylformamide, dimethylacetamide, dimethyl sulfoxide, N-methylpyrrolidone, benzene, toluene, chloroform, tetrahydrofuran, and acetone.

In one embodiment of the present invention, the second organic solvent is one or more selected from the group consisting of methanol, ethanol, and diethyl ether.

The step of providing the first organic solvent dispersion of the graphene powder and/or graphene oxide powder, the powder material to be coated with graphene, and the polymeric co-coating agent dispersed in the first organic solvent can be performed in a single step, or in multiple steps. For example, the graphene powder and/or graphene oxide powder, the powder material to be coated with graphene, and the polymeric co-coating agent can be dispersed together in a certain amount of the first organic solvent to form the first organic solvent dispersion. Alternatively, the graphene powder and/or graphene oxide powder, the powder material to be coated with graphene, and the polymeric co-coating agent can be separately dispersed in a certain amount of the first organic solvent, and then mixed to form the first organic solvent dispersion.

The graphene powder and/or graphene oxide powder and the powder material to be coated with graphene can be dispersed in the first organic solvent by various suitable manners. Preferably, the graphene powder and/or graphene oxide powder are dispersed in the first organic solvent by an ultrasonic dispersion process. The graphene powder and/or graphene oxide powder generally have a large specific surface area, and therefore tend to agglomerate, thereby affecting the performance of the properties. Ultrasonic dispersion helps the powders to de-agglomerate and also aids in the further dissociation of the sheet layers of the graphene powder and/or graphene oxide powder per se, so as to provide graphene and/or graphene oxide that have a smaller size and are more uniformly dispersed in the solvent.

In one embodiment, the first organic solvent dispersion can be provided by the following steps: A1) ultrasonically dispersing the graphene powder and/or graphene oxide powder in the first organic solvent, to form a graphene and/or graphene oxide dispersion; A2) uniformly dispersing the powder material to be coated with graphene in the first organic solvent, adding the polymeric co-coating agent, and stirring the mixture to give a powder material dispersion; and A3) mixing the graphene and/or graphene oxide dispersion with the powder material dispersion to obtain the first organic solvent dispersion. In this case, steps A1) and A2) can be performed simultaneously or sequentially in any order. The first organic solvent in steps A1) and A2) can be selected independently of each other, and can be same or different.

In an alternative embodiment, the first organic solvent dispersion can be provided by the following steps: A1) ultrasonically dispersing the graphene powder and/or graphene oxide powder in the first organic solvent, to form a graphene and/or graphene oxide dispersion; A2) uniformly dispersing the powder material to be coated with graphene in the graphene and/or a graphene oxide dispersion, adding the polymeric co-coating agent, and stirring the mixture to obtain the first organic solvent dispersion.

In still another alternative embodiment, the first organic solvent dispersion can be formed by the following steps: A1) ultrasonically dispersing the graphene powder and/or graphene oxide powder in the first organic solvent, to form a graphene and/or graphene oxide dispersion; A2) uniformly dispersing the powder material to be coated with graphene in the first organic solvent, and stirring the mixture to give a powder material dispersion; and A3) adding the polymeric co-coating agent to the first organic solvent, and sufficiently stirring the mixture to give a polymeric co-coating agent solution, and A4) mixing the graphene and/or graphene oxide dispersion, the powder material dispersion and the polymeric co-coating agent solution to obtain the first organic solvent dispersion. In this case, steps A1), A2) and A3) can be performed simultaneously or sequentially in any order. The first organic solvent in steps A1), A2) and A3) can be selected independently of each other, and can be same or different.

The step of mixing the first organic solvent dispersion with the second organic solvent is not particularly limited and can be carried out in any suitable manner.

In one embodiment, the step of mixing the first organic solvent dispersion with the second organic solvent may include injecting the first organic solvent dispersion into the second organic solvent while stirring.

In an alternative embodiment, the step of mixing the first organic solvent dispersion with the second organic solvent may include injecting the second organic solvent into the first organic solvent dispersion while stirring.

When the first organic solvent dispersion is mixed with the second organic solvent, a precipitate will be generated. Preferably, the mixing is carried out under stirring. The precipitate can be separated by any suitable method and preferably dried. For example, the precipitate can be separated by subjecting the resulting mixture to sedimentation. In one embodiment, the precipitate is separated by gravity sedimentation. In another embodiment, the precipitate is separated by centrifugal sedimentation. Further, a dried precipitate can be obtained by centrifugation, washing, vacuum drying, or a combination thereof.

In a preferred embodiment, the second organic solvent has a boiling point lower than that of the first organic solvent. This allows the solvent to be removed at a lower temperature during the post-treatment of the resulting precipitate.

In a preferred embodiment, the volume ratio of the second organic solvent to the first organic solvent used is 1:1 or more, preferably 2:1 or more, more preferably 3:1 or more. Without wishing to be bound by any theory, it is believed that the greater the amount of the second organic solvent is, the less the first organic solvent remains in the resulting precipitate, and thus the less the first organic solvent that needs to be removed from the separated precipitate is.

The step of annealing the precipitate in an inert atmosphere can be carried out in any manner that facilitates the carbonization of the polymeric co-coating agent and the formation of a stable coating of graphene.

In one embodiment, the inert atmosphere is an atmosphere in which one or more of nitrogen, helium, neon, argon, krypton, and xenon are used as a protection gas. Preferably, the oxygen content in the inert atmosphere is less than 5 ppm, more preferably less than 1 ppm, and most preferably 0.

In the present invention, the term "annealing" refers to a heat treatment process involving heating to a certain annealing temperature for a sufficient annealing time, and then cooling at a suitable rate (slow cooling or controlled cooling). The annealing can carbonize the polymeric co-coating agent, reduce the number of the oxygen-containing functional groups in the graphene coating layer, increase the purity of graphene, and improve the electrical conductivity. Moreover, the annealing can change the distribution of residual oxygen atoms on the surface of graphene, such that the oxygen atoms can be regularly gathered together, and meanwhile there will be pure graphene voids left, thereby keeping the original structure of graphene unchanged and avoiding defects.

In one embodiment, the annealing comprises the steps of: 1) raising the temperature from room temperature to an intermediate temperature of A° C. at a ramping rate of 1-3° C./min, and then holding for X hours; and 2) further raising the temperature to a maximum temperature of B° C. at a ramping rate of 3-6° C./min, and then holding for Y hours; wherein $Y \geq 2X \geq 2$, and $300 \leq A < B \leq 800$.

In a specific embodiment, the annealing comprises the steps of: 1) raising the temperature from room temperature to an intermediate temperature of 300-500° C. at a ramping rate of 1-3° C./min, and then holding for 1-2 hours; and 2) further raising the temperature to a maximum temperature of 500-800° C. at a ramping rate of 3-6° C./min, and then holding for 2-3 hours.

In the present invention, the term "coating" means that at least a part of the surface, preferably most of the surface, more preferably all of the surface of an object is covered by another substance. The graphene-coated powder material prepared according to the present invention means that at least a part of the surface of the powder material is covered by graphene. Preferably, at least 20%, preferably at least 30%, more preferably at least 50%, even more preferably at least 80% of the surface of the powder material in the graphene-coated powder material prepared according to the present invention is covered by graphene.

In one embodiment, the graphene powder and/or graphene oxide powder is used in an amount of from 1 wt % to 25 wt %, preferably from 3 wt % to 20 wt %, more preferably from 5 wt % to 15 wt %, and most preferably from 8 wt % to 13 wt % based on the total weight of the graphene powder and/or graphene oxide powder, the powder material to be coated with graphene, and the polymeric co-coating agent.

In one embodiment, the polymeric co-coating agent is used in an amount of from 0.01 wt % to 20 wt %, preferably from 0.1 wt % to 15 wt %, more preferably from 0.5 wt % to 10 wt %, and most preferably from 0.8 wt % to 1.5 wt % or from 1 wt % to 5 wt % based on the total weight of the graphene powder and/or graphene oxide powder, the powder material to be coated with graphene, and the polymeric co-coating agent.

The graphene-coated powder material prepared by the method of the present invention has more stable coating properties. In particular, the graphene-coated lithium ion battery cathode material prepared by the method of the present invention has improved rate performance and cycle performance.

EXAMPLES

Certain specific embodiments of the present invention will be illustrated below with reference to the examples, so that those skilled in the art can understand the technical solutions of the present invention and the advantages thereof more clearly. The examples should not be construed as limiting the present invention in any way.

The raw materials and devices used in the examples are as follows:

Graphene prepared by a redox process: Sinocarbon TM-02PI-02 conductive graphene, available from Shanxi Institute of Coal Chemistry, Chinese Academy of Sciences Graphene prepared by a mechanical ultrasonic process: graphene powder TA-001A, available from Xiamen Knano Graphene Technology Co., Ltd.

Graphene oxide: Sinocarbon TM-01PI-01 graphite oxide powder, available from Shanxi Institute of Coal Chemistry, Chinese Academy of Sciences Polyvinylidene fluoride, available from J&K Scientific Co., Ltd. (CAS: 24937-79-9)

Lithium cobaltate: available from Beijing Easpring Material Technology Co., Ltd.

Ternary materials: NCM532, available from Ningbo Jinhe New Materials Co., Ltd.
NCM811, available from Ningbo Jinhe New Materials Co., Ltd.
NCM622, available from Ningbo Jinhe New Materials Co., Ltd.
Polyacrylonitrile: available from Sinopharm Chemical Reagent Co., Ltd. (CAS: 25014-41-9) Lithium Manganate: available from Changsha Shanshan Power Battery Co., Ltd.
Polystyrene: available from Aladdin Reagents (CAS: 9003-53-6)
Tube Furnace: available from Shanghai Jvjing Precision Instrument Manufacturing Co., Ltd. (SKGL-1200C)

The prepared graphene-coated material was assembled into a button cell for rate testing and cycle testing, and the testing device was a high-precision battery performance testing system (model CT-4008-5V20 mA-S4) from Neware Electronics Co., Ltd.

Assembly of the button cell: the cathode material coated or uncoated with graphene, conductive carbon black and polyvinylidene fluoride (PVDF) were well mixed in N-methylpyrrolidone (NMP) at a mass ratio of 90:5:5, to prepare an electrode slurry which can be coated. Then, it was coated on an aluminum foil to prepare an electrode plate having a diameter of 1 cm. The electrode plate was used as a cathode, and a lithium plate was used as an anode, which were separated by a polypropylene (PP) separator. In an argon glove box, 1 M $LiPF_6$ electrolyte was dropped, and then the cell (CR2032) shell was sealed and shaped. The performances were tested after standing overnight.

The specific capacities were measured at rate testing currents of 0.2 C, 0.5 C, 1 C, 2 C, 3 C, 5 C, and 10 C. The charge current was 3 C charging/1 C discharging during the cycle testing.

Example 1

1. 3 g of graphene prepared by a redox process was weighed out and dispersed in N-methylpyrrolidone (NMP). The mixture was ultrasonicated in a cell disruptor for 2 h, and then stirred to obtain a dispersion of graphene in NMP.
2. 20 g of lithium cobaltate was weighed out and dispersed in NMP, mechanically stirred for 0.5 h, and stirred for 2 h after addition of 0.25 g of polyvinylidene fluoride (PVDF).
3. The dispersion of graphene in NMP was poured into the lithium cobaltate dispersion and stirred. The mixture was quickly poured into a methanol solution while mechanically stirring. After sedimentation, the precipitate was separated, washed with ethanol, and dried in vacuo to give a black powder.
4. The black powder was placed in a tube furnace. In an argon atmosphere, the temperature was raised from room temperature to an intermediate temperature of 300° C. at a rate of 2° C./min, and held for 1 hour, and then raised to the final carbonization temperature of 500° C. at a ramping rate of 5° C./min, and held for 3 hours, to obtain the final graphene-coated lithium cobaltate material.
5. The prepared material was assembled into a button cell for testing at a voltage ranging from 3 V to 4.4 V. The specific capacity was 170 mAh/g at a rate testing current of 0.2 C; the capacity retention rate was 85% at 5 C; and the capacity retention rate was 97% after 150 3 C/1 C cycles.

Figure 1:
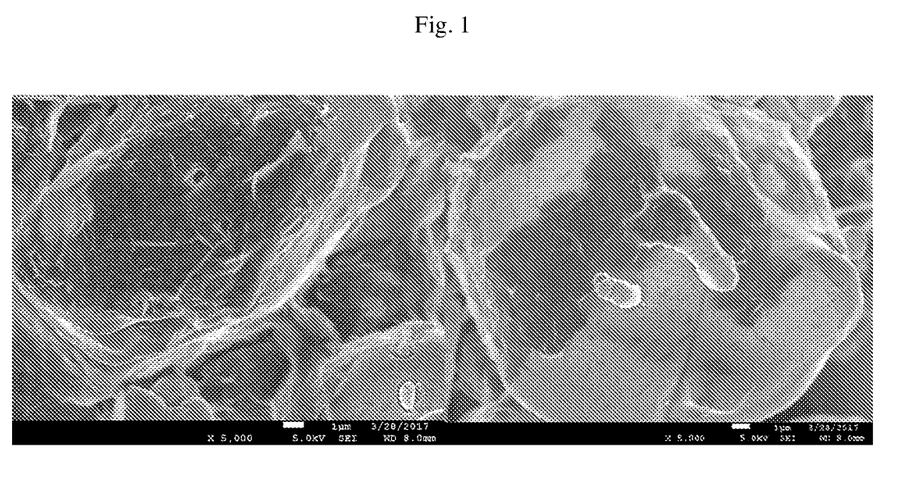
FIG. 1 is a scanning electron micrograph of a graphene-coated lithium cobaltate powder (a lithium ion battery cathode material) prepared according to one embodiment of the present invention.

FIG. 1 shows a scanning electron micrograph of the graphene-coated lithium cobaltate material prepared as above. As can be seen from FIG. 1, the graphene was uniformly and tightly coated on the surface of the lithium cobaltate material, and was almost integrated with the lithium cobaltate material.

Example 2

1. 3.5 g of graphene prepared by a mechanical ultrasonic process was weighed out and dispersed in DMF. The mixture was ultrasonicated in a cell disruptor for 2 h, and then stirred to obtain a dispersion of graphene in DMF.
2. 20 g of a ternary material (NCM532) was weighed out and dispersed in DMF, mechanically stirred for 0.5 h, and stirred for 2 h after addition of 0.3 g of polyacrylonitrile (PAN).
3. The dispersion of graphene in DMF was poured into the ternary material (NCM532) dispersion and stirred. The mixture was quickly poured into an ethanol solution while mechanically stirring. After sedimentation, the precipitate was separated, washed with ethanol, and dried in vacuo to give a black powder.
4. The black powder was placed in a tube furnace. In an argon atmosphere, the temperature was raised from room temperature to an intermediate temperature of 400° C. at a rate of 3° C./min, and held for 1 hour, and then raised to the final carbonization temperature of 700° C. at a ramping rate of 5° C./min, and held for 2 hours, to obtain the final graphene-coated ternary material (NCM532).
5. The prepared material was assembled into a button cell for testing at a voltage ranging from 3 V to 4.3 V. The specific capacity was 155 mAh/g at a rate testing current of 0.2 C; the capacity retention rate was 85% at 5 C; and the capacity retention rate was 85% after 150 3 C/1 C cycles.

Example 3

1. 5 g of graphene prepared by a mechanical ultrasonic process was weighed out and dispersed in dimethylformamide (DMF). The mixture was ultrasonicated in a cell disruptor for 2 h, and then stirred to obtain a dispersion of graphene in DMF.
2. 20 g of a ternary material (NCM811) was weighed out and dispersed in DMF, mechanically stirred for 0.5 h, and stirred for 2 h after addition of 0.5 g of PVDF.
3. The dispersion of graphene in DMF was poured into the ternary material (NCM811) dispersion and stirred. The mixture was quickly poured into a methanol solution while mechanically stirring. After sedimentation, the precipitate was separated, washed with ethanol, and dried in vacuo to give a black powder.
4. The black powder was placed in a tube furnace. In an argon atmosphere, the temperature was raised from room temperature to an intermediate temperature of 500° C. at a rate of 3° C./min, and held for 1 hour, and then raised to the final carbonization temperature of 800° C. at a ramping rate of 6° C./min, and held for 2 hours, to obtain the final graphene-coated ternary material (NCM811).
5. The prepared material was assembled into a button cell for testing at a voltage ranging from 3 V to 4.3 V. The specific capacity was 190 mAh/g at a rate testing current of 0.2 C; the capacity retention rate was 83% at 5 C; and the capacity retention rate was 87% after 150 3 C/1 C cycles.

Example 4

1. 0.3 g of graphene prepared by a mechanical ultrasonic process was weighed out and dispersed in dimethyl sulfoxide (DMSO). The mixture was ultrasonicated in a cell disruptor for 2 h, and then stirred to obtain a dispersion of graphene in DMSO.
2. 20 g of lithium manganate was weighed out and dispersed in DMSO, mechanically stirred for 0.5 h, and stirred for 2 h after addition of 0.5 g of polystyrene (PS).
3. The dispersion of graphene in DMSO was poured into the lithium manganate dispersion and stirred. The mixture was quickly poured into a methanol solution while mechanically stirring. After sedimentation, the precipitate was separated, washed with ethanol, and dried in vacuo to give a black powder.
4. The black powder was placed in a tube furnace. In an argon atmosphere, the temperature was raised from room temperature to an intermediate temperature of 400° C. at a rate of 1° C./min, and held for 1 hour, and then raised to the final carbonization temperature of 500° C. at a ramping rate of 3° C./min, and held for 4 hours, to obtain the final graphene-coated lithium manganate material.
5. The prepared material was assembled into a button cell for testing at a voltage ranging from 3 V to 4.3 V. The specific capacity was 109 mAh/g at a rate testing current of 0.2 C; the capacity retention rate was 82% at 5 C; and the capacity retention rate was 88% after 150 3 C/1 C cycles.

Example 5

1. 0.5 g of graphene prepared by a redox process was weighed out and dispersed in DMF. The mixture was ultrasonicated in a cell disruptor for 2 h, and then stirred to obtain a dispersion of graphene in DMF.
2. 20 g of a ternary material (NCM622) was weighed out and dispersed in DMF, mechanically stirred for 0.5 h, and stirred for 2 h after addition of 0.7 g of polystyrene (PS).
3. The dispersion of graphene in DMF was poured into the ternary material (NCM622) dispersion and stirred. The mixture was quickly poured into a methanol solution while mechanically stirring. After sedimentation, the precipitate was separated, washed with ethanol, and dried in vacuo to give a black powder.
4. The black powder was placed in a tube furnace. In an argon atmosphere, the temperature was raised from room temperature to an intermediate temperature of 300° C. at a rate of 2° C./min, and held for 1.5 hours, and then raised to the final carbonization temperature of 700° C. at a ramping rate of 5° C./min, and held for 3 hours, to obtain the final graphene-coated ternary material.
5. The prepared material was assembled into a button cell for testing at a voltage ranging from 3 V to 4.3 V. The specific capacity was 180 mAh/g at a rate testing current of 0.2 C; the capacity retention rate was 80% at 5 C; and the capacity retention rate was 70% after 150 3 C/1 C cycles.

Comparative Example 1. Graphene Coating by a Physical Method 1. 3 g of graphene prepared by a redox process was weighed out and dispersed in N-methylpyrrolidone (NMP). The mixture was ultrasonicated in a cell disruptor for 2 h, and then stirred to obtain a dispersion of graphene in NMP.
2. 20 g of lithium cobaltate was weighed out and dispersed in NMP, and mechanically stirred for 2 h.
3. The dispersion of graphene in NMP was poured into the lithium cobaltate dispersion and well mixed by stirring. After the solvent was directly distilled off, the mixture was dried in vacuo to obtain the final lithium cobaltate material coated with graphene by the physical method.
4. The prepared material was assembled into a button cell for testing at a voltage ranging from 3 V to 4.4 V. The specific capacity was 170 mAh/g at a rate testing current of 0.2 C; the capacity retention rate was 68% at 5 C; and the capacity retention rate was 94% after 150 3 C/1 C cycles.

Comparative Example 2. Graphene Coating by a Chemical Method 1. 3 g of graphene oxide was weighed out and dispersed in N-methylpyrrolidone (NMP). The mixture was ultrasonicated in a cell disruptor for 2 h, and then stirred to obtain a dispersion of graphene oxide in NMP.
2. 20 g of lithium cobaltate was weighed out and dispersed in NMP, and mechanically stirred for 2 h.
3. The dispersion of graphene oxide in NMP was poured into the lithium cobaltate dispersion and well mixed by stirring. Then, 9 g of vitamin C as the reducing agent was added and reacted at room temperature for 5 h. After centrifugation and washing, a black mixture was obtained. After vacuum drying, the final lithium cobaltate material coated with graphene by the chemical method was obtained.
4. The prepared material was assembled into a button cell for testing at a voltage ranging from 3 V to 4.4 V. The specific capacity was 170 mAh/g at a rate testing current of 0.2 C; the capacity retention rate was 72% at 5 C; and the capacity retention rate was 95% after 150 3 C/1 C cycles.

Figure 2:
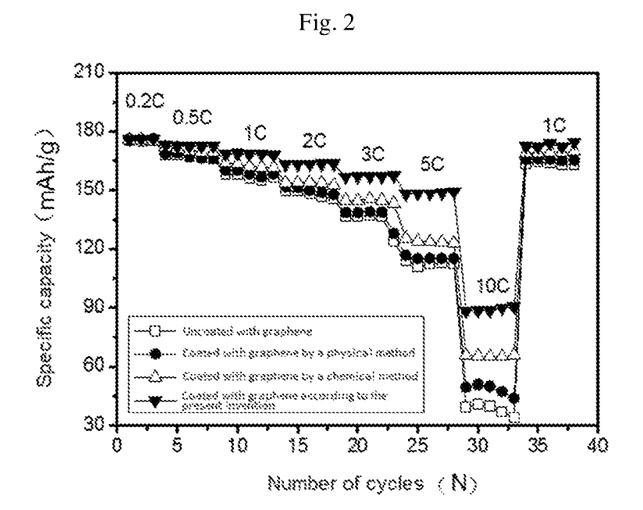
FIG. 2 shows a rate testing graph of a lithium cobaltate powder not coated with graphene, a graphene-coated lithium cobaltate powder prepared by a conventional physical method, a graphene-coated lithium cobaltate powder prepared by a conventional chemical method, and a graphene-coated lithium cobaltate powder prepared by the method of the present invention at different currents.

FIG. 2 shows a rate testing graph of the lithium cobaltate powder not coated with graphene, the graphene-coated lithium cobaltate powder prepared by a conventional physical method (Comparative Example 1), the graphene-coated lithium cobaltate powder prepared by a conventional chemical method (Comparative Example 2), and the graphene-coated lithium cobaltate powder prepared by the method of the present invention (Example 1) at different currents. In the rate testing, the current gradually increased with the increase in the number of testing cycles. For example, in FIG. 2, when the number of cycles is 1-3, the current is 0.2 C; when the number of cycles is 4-8, the current is 0.5 C; when the number of cycles is 9-13, the current is 1 C; when the number of cycles is 14-18, the current is 2 C; when the number of cycles is 19-23, the current is 3 C; when the number of cycles is 24-28, the current is 5 C; and when the number of cycles is 29-33, the current is 10 C.

As can be seen from FIG. 2, the graphene-coated lithium cobaltate powder prepared by the method of the present invention had an initial specific capacity very close to that of the lithium cobaltate powder not coated with graphene, the graphene-coated lithium cobaltate powder prepared by a conventional physical method (Comparative Example 1), and the graphene-coated lithium cobaltate powder prepared by a conventional chemical method (Comparative Example 2). However, as the testing current increased, the graphene-coated lithium cobaltate powder prepared by the method of the present invention exhibited a specific capacity significantly superior to that of the other three materials, and exhibited excellent rate performance.

Figure 3:
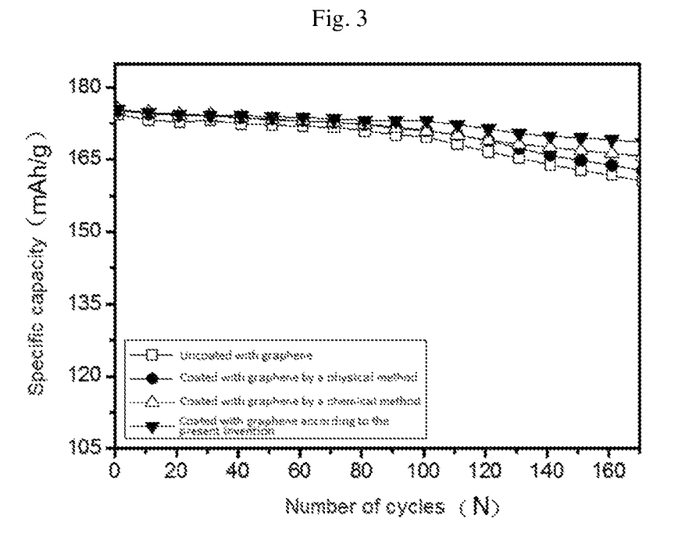
FIG. 3 shows a cycle testing graph of a lithium cobaltate powder not coated with graphene, a graphene-coated lithium cobaltate powder prepared by a conventional physical method, a graphene-coated lithium cobaltate powder prepared by a conventional chemical method, and a graphene-coated lithium cobaltate powder prepared by the method of the present invention at 3 C/1 C.

FIG. 3 shows a cycle testing graph of the lithium cobaltate powder not coated with graphene, the graphene-coated lithium cobaltate powder prepared by a conventional physical method (Comparative Example 1), the graphene-coated lithium cobaltate powder prepared by a conventional chemical method (Comparative Example 2), and a graphene-coated lithium cobaltate powder prepared by the method of the present invention (Example 1) at 3 C/1 C. As can be seen from FIG. 3, the graphene-coated lithium cobaltate powder prepared by the method of the present invention had an initial specific capacity very close to that of the lithium cobaltate powder not coated with graphene, the graphene-coated lithium cobaltate powder prepared by a conventional physical method (Comparative Example 1), and the graphene-coated lithium cobaltate powder prepared by a conventional chemical method (Comparative Example 2). However, as the number of 3 C/1 C cycles increased, the graphene-coated lithium cobaltate powder prepared by the method of the present invention exhibited a specific capacity significantly superior to that of the other three materials. The graphene-coated lithium cobaltate powder prepared by the method of the present invention still had a specific capacity very close to the initial specific capacity after 150 3 C/1 C cycles, with a capacity retention rate of 93%.

Therefore, the method of the present invention improves the coating of powder materials with graphene. The method of the present invention is simple and easy to carry out. The graphene-coated lithium ion battery cathode material prepared by the method has more uniform and stable graphene coating properties, and is stable and not easy to fall off after multiple cycles. The electrochemical test results show significantly improved rate performance and more stable cycle performance as compared with the prior art.

Although the present invention has been described above in connection with the accompanying drawings, the present invention is not limited to the specific embodiments described above. The specific embodiments described above are merely illustrative and not restrictive. With the teachings of the present invention, those skilled in the art can make changes and modifications to the above embodiments without departing from the spirit or scope of the present invention. Such changes and modifications are all within the protection scope of the present invention.

What is claimed is:

1. A method for preparing a graphene-coated powder material, comprising the steps of:
    A) providing a first organic solvent dispersion of a graphene powder and/or graphene oxide powder, a powder material to be coated with graphene, and a polymeric co-coating agent dispersed in a first organic solvent;
    B) mixing the first organic solvent dispersion with a second organic solvent and separating a precipitate; and
    C) annealing the precipitate in an inert atmosphere to obtain the graphene-coated powder material;
    wherein the polymeric co-coating agent is soluble in the first organic solvent but insoluble in the second organic solvent; and
    wherein the annealing comprises the steps of:
        1) Raising the temperature from room temperature to an intermediate temperature of 300-500° C. at a ramping rate of 1-3° C./min, and then holding for 1-2 hours; and
        2) further raising the temperature to a maximum temperature of 500-800° C. at a ramping rate of 3-6° C./min, and then holding for 2-3 hours;
    wherein Y≥2X≥2, and 300≤A<B≤800; and
    wherein the powder material is a lithium ion battery cathode material, and the lithium ion battery cathode material is one or more selected from the group consisting of lithium manganate, lithium cobaltate, and a ternary material selected from the group consisting of nickel-cobalt-manganese ternary materials, nickel-cobalt-aluminum ternary materials, and lithium-rich ternary materials.

2. The method according to claim 1, wherein the powder material is a lithium ion battery cathode material.

3. The method according to claim 2, wherein the lithium ion battery cathode material is one or more selected from the group consisting of lithium manganate, lithium cobaltate, lithium iron phosphate, and a ternary material.

4. The method according to claim 3, wherein the ternary material is one or more selected from the group consisting of nickel-cobalt-manganese ternary materials, nickel-cobalt-aluminum ternary materials, and lithium-rich ternary materials.

5. The method according to claim 1, wherein the polymeric co-coating agent is one or more selected from the group consisting of polyolefins, polyesters, polyethers, polyamides, polyurethanes, celluloses, polysiloxanes, polynitriles, polyureas, and polysulfones.

6. The method according to claim 1, wherein the polymeric co-coating agent is one or more selected from the group consisting of polyethylene, polyvinylidene fluoride, polyvinyl chloride, polystyrene, polyvinyl acetate, polyvinyl ether, polypropylene, polyacrylonitrile, polymethyl methacrylate and polycarbonate.

7. The method according to claim 1, wherein the first organic solvent is one or more selected from the group consisting of dimethylformamide, dimethylacetamide, dimethyl sulfoxide, N-methylpyrrolidone, benzene, toluene, chloroform, tetrahydrofuran, and acetone.

8. The method according to claim 1, wherein the second organic solvent is one or more selected from the group consisting of methanol, ethanol and diethyl ether.

9. The method according to claim 1, wherein the step A) comprises the steps of:
    A1) ultrasonically dispersing the graphene powder and/or graphene oxide powder in the first organic solvent, to form a graphene and/or graphene oxide dispersion;
    A2) uniformly dispersing the powder material to be coated with graphene in the first organic solvent, adding the polymeric co-coating agent, and stirring the mixture to give a powder material dispersion; and
    A3) mixing the graphene and/or graphene oxide dispersion with the powder material dispersion to obtain the first organic solvent dispersion.

10. The method according to claim 1, wherein the step B) comprises the steps of:
    B1) injecting the first organic solvent dispersion into the second organic solvent while stirring;
    B2) subjecting the mixture from step B1) to sedimentation to give a precipitate; and
    B3) separating and drying the precipitate.

11. The method according to claim 1, wherein the graphene powder and/or graphene oxide powder is used in an amount of from 1 wt % to 25 wt % based on the total weight of the graphene powder and/or graphene oxide powder, the powder material to be coated with graphene, and the polymeric co-coating agent.

12. The method according to claim 1, wherein the polymeric co-coating agent is used in an amount of from 0.01 wt % to 20 wt % based on the total weight of the graphene powder and/or graphene oxide powder, the powder material to be coated with graphene, and the polymeric co-coating agent.

13. The method according to claim 1, wherein the second organic solvent has a boiling point lower than that of the first organic solvent.

14. The method according to claim 1, wherein the volume ratio of the second organic solvent to the first organic solvent used is 2:1 or more.

15. The method according to claim 1, wherein the graphene powder is prepared by a redox process and/or a liquid phase ultrasonic exfoliation process.

\* \* \* \* \*